S. HUGHES.
POWER TRANSMISSION.
APPLICATION FILED MAY 19, 1910.
1,036,119.
Patented Aug. 20, 1912.
2 SHEETS—SHEET 1.
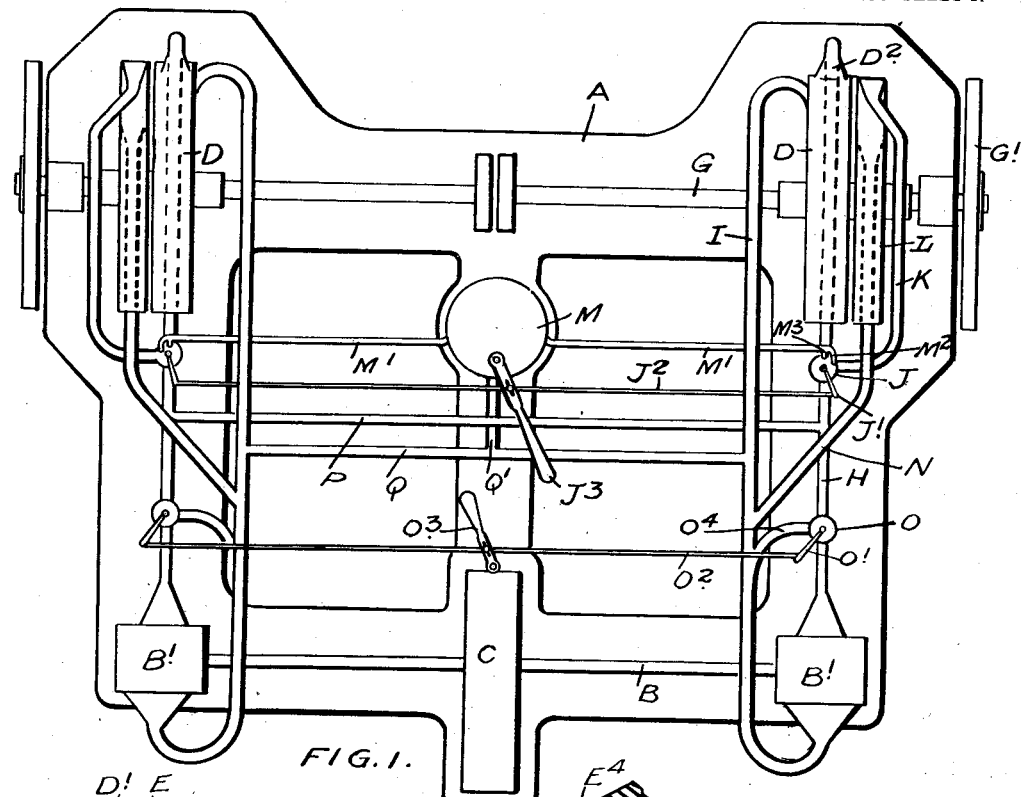
FIG. 1.
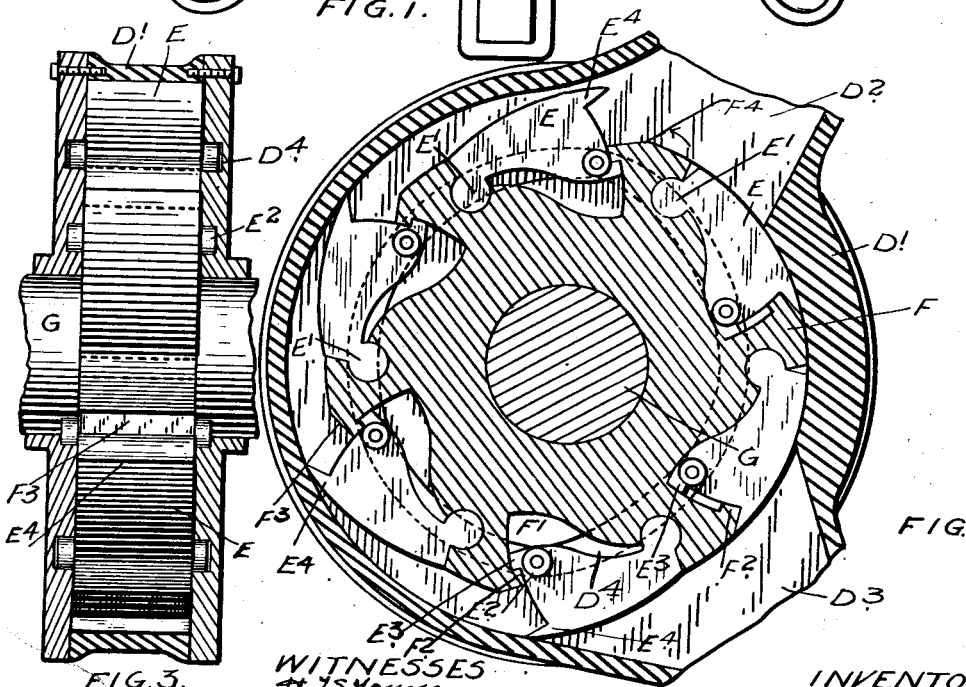
FIG. 3.                FIG. 2.
WITNESSES
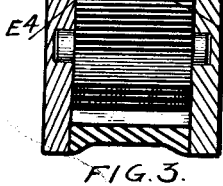
INVENTOR.
S. HUGHES

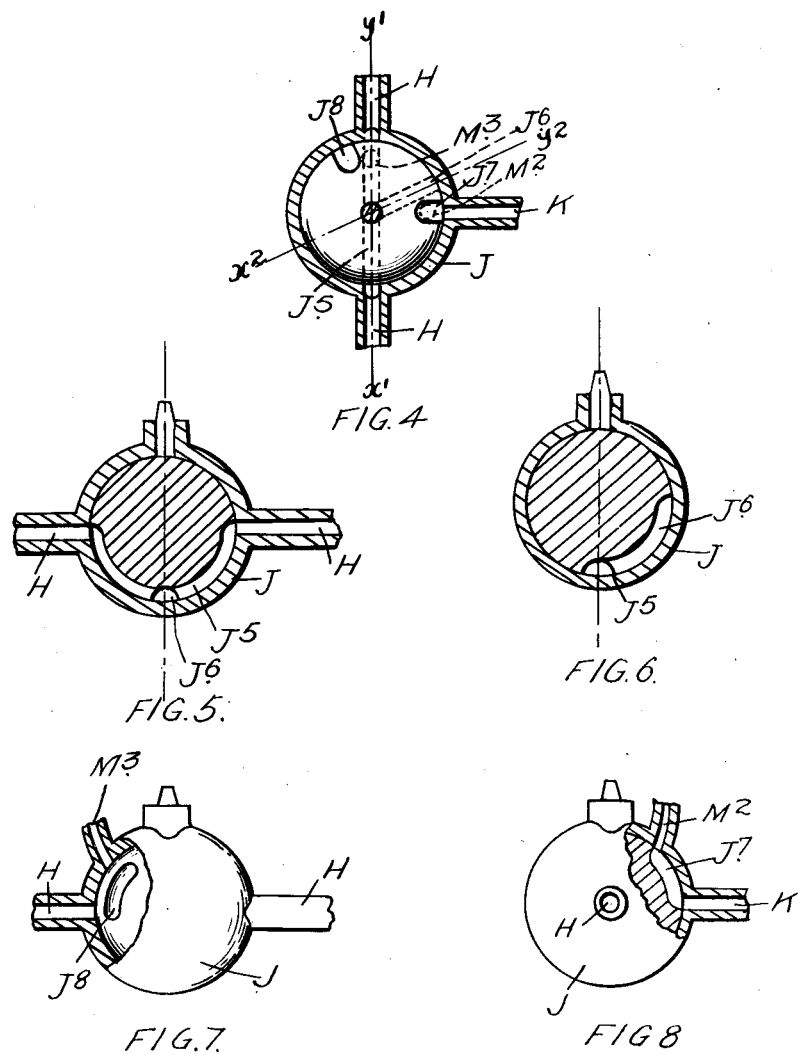

UNITED STATES PATENT OFFICE.

SAMUEL HUGHES, OF LINDSAY, ONTARIO, CANADA.

POWER TRANSMISSION.

1,036,119.  Specification of Letters Patent.  Patented Aug. 20, 1912.

Application filed May 19, 1910. Serial No. 562,202.

*To all whom it may concern:*

Be it known that I, SAMUEL HUGHES, of the town of Lindsay, in the county of Victoria, in the Province of Ontario, Canada, have invented certain new and useful Improvements in Power Transmission, of which the following is the specification.

My invention relates to improvements in power transmission, particularly adapted for self propelled vehicles, and the object of the invention is to devise a transmission for vehicles which will be simple in construction, obviate the use of differential gear, speed clutches, reduce the amount of gearing to a minimum and do away with brakes, lubrication and friction chains or other forms of drive now commonly in use.

A further object is to make the control extremely simple and easy to operate, and practically noiseless.

Further objects are to eliminate friction and all moving parts between the engine shaft and main axle.

To effect these objects I have constructed and arranged my invention with a main engine shaft, pumps driven therefrom, a main axle, motors thereon and tubular connections between the motors and the pumps, both for go-ahead and reverse movements of the car as hereinafter more particularly explained.

Figure 1, is a plan view of my improved driving gear. Fig. 2, is a section through one of the motors. Fig. 3, is a cross section through one of the motors. Fig. 4 is a sectional plan of the valve. Fig. 5 is a sectional view on the line $x'-y'$ Fig. 4. Fig. 6 is a sectional view on line $x^2-y^2$ Fig. 4. Fig. 7 is a side elevation of the valve partially broken away and in section. Fig. 8 is a front elevation of the valve.

In the drawings like letters of reference indicate corresponding parts in each figure.

A is the chassis, which may be made of any suitable style depending on the location and arrangement of the parts.

B is the main engine shaft and C the engine, which may be of any suitable type.

B' are the pumps, which may be of any suitable centrifugal type preferably of the style disclosed in the application filed May 19, 1910, for high pressure rotary pumps, Serial Number 562,201.

D are the motors. D' is the casing thereof, $D^2$ the inlet (see Fig. 2) and $D^3$ the discharge or exhaust.

E are blades having substantially cylindrical pivotal pins E' attached to or forming part of the same fitting in a corresponding recess in proximity to the periphery of the circular piston F, which is secured on the shaft G. The piston F is eccentrically placed in reference to the casing as clearly indicated in Fig. 2.

The casing D' is provided with end grooves $D^4$ in which ride the rollers $E^2$ journaled on pins on the blades. The blades fit into recesses F' in the periphery of the piston F having a compound curvular inner contour. The inner side of the blade is correspondingly formed and provided with a projection $E^3$, which limits the outer movement of the blades by coming in contact with the shoulder $F^2$. The major portion of the swinging end of the blade is concentric to the pivotal center of the blade and the outer end is provided with a shoulder $E^4$, which is adapted to fit into a corresponding recess $F^3$ immediately outside of the shoulder $F^2$. A still further shoulder $F^4$ is provided against which the end of the tail $E^4$ fits. The outer face of the blade E is concentric to the center of rotation when it is in the closed position. The blade is caused to assume the various positions during rotation as clearly shown in the drawing, and is thereby impelled by the liquid passing through the pipe H into the inlet $D^2$. The discharge tube or pipe I from the motor D passes backwardly again into the pump B'.

The piston of the motor D is connected in each case to the divided axle G of the main divided axle, which carries the wheels G' at the outer end. The motor D is located at each end of the shaft G.

J is a two-way valve located at the juncture of the pipe H with the pipe K leading to the reversing motor L. The handles J' of the valves are connected together by a cross rod $J^2$, which is operated by a lever $J^3$, so as to throw the valves simultaneously into a corresponding position.

M is a reservoir connected by the pipes M' and branches M² to the valve J opposite the pipe K and by branches M³ to the valve J opposite the pipe H. These pipes and reservoir are designed to take the pressure off the motors D or L when they are in operation.

The valve O serves to cut off communication with the motors allowing the pump to run idle when it is desired to stop the motors.

It will be understood that both the forward and reverse motors D and L respectively are secured to the same axle G. It will thus be seen that when the motor D is operating, the reversing motor will be carried around with the motor D and thus produce a back pressure in the pipe K. To overcome this, I have provided the valves J into the casing of which the pipe K and H extend.

J⁵ is a channel way in the valve J connecting the two portions of the pipe H extending from each side of the valve J.

J⁶ is a branch of the channel J⁵. The channel J⁶ leads around the circumference of the valve to a point on a level with the pipe K so as to register therewith when the valve is turned.

J⁷ and J⁸ are segmental channels designed to alternately connect the pipes M² and M³ with the pipes K and H.

It will thus be seen that when the motor D is driven, the back pressure caused by the reverse motion of motor L is relieved through the pipe K, segmental passage J⁷, and pipes M² and M' to the reservoir M. Similarly when the motor L is the driving motor the motor D will be running in the reverse direction and the back pressure thereof will be relieved through the pipe H, channel J⁸, pipe M³ and pipe M' to the reservoir.

N is a discharge pipe of the reversing motor, which connects with the pipe I.

O are two-way valves provided with handles O' and connected together by a rod O², so as to be operated simultaneously by a lever O³. The valves O are connected by branch pipes O⁴ to the pipe I. By throwing the rod O² in the opposite position to that shown in the drawing the motors D will not communicate any motion to the shaft G, but will establish a circuit through the pipes H O⁴ and I back and through the pump B'. It will now be seen by operating the lever J³ the forward motor D or reverse motor L may be thrown into a circuit of the liquid and thereby impelled to go forward or back up. The amount of speed may be regulated by the lever O³, if the engine is maintained at a constant speed. If not it may be regulated by cutting down the speed of the engine or it may be regulated by both.

P is an equalizing pipe extending between the pipes H, and Q is an equalizing pipe extending between the pipes I. The pipe Q is connected to the reservoir M by a branch Q'. These pipes are designed to provide for the turning of the vehicle.

Although I describe with great particularity the various parts involved in my invention it will, of course, be understood that they are used simply as a means of exemplification or illustration, and that various changes may be made in detail without departing from the spirit of my invention.

What I claim as my invention is:

1. In apparatus of the class described the combination with the main axle and the driving or engine shaft, of a pair of rotary liquid pumps driven from the engine shaft, a pair of main and a pair of reversing liquid motors on the main axle suitable pipe connections between the pumps and the main and reversing motors, a reservoir intermediate of the motors, and means whereby the said reservoir may be connected to both main or reversing motors according to which is idle to relieve back pressure, substantially as described.

2. The combination with the main divided axle and the engine or driving shaft, of a pair of rotary liquid pumps on the engine shaft, rotary main and reversing motors on the axle, a flow pipe connection from the delivery side of each pump having branches leading to the inlet side of the main and reversing motors respectively, return pipes connecting the outlet of the motors with the inlets of the pumps, a reservoir connected with said return pipes, pipe connections from said reservoir to the junction of said branches with the flow pipes, and valves controlling such connection, substantially as described.

3. The combination with the main divided axle and the engine or driving shaft, of a pair of rotary liquid pumps on the engine shaft, rotary main and reversing motors on the axle, a flow pipe connection from the delivery side of each pump having branches leading to the inlet side of the main and reversing motors respectively, return pipes connecting the outlet of the motors with the inlets of the pumps, a reservoir connected with said return pipes, pipe connections from said reservoir to the junction of said branches with the flow pipes, and valves controlling such connection.

4. The combination with the main divided axle and the engine or driving shaft, of a pair of rotary liquid pumps on the engine shaft, rotary main and reversing motors on the axle, a flow pipe connection from the delivery side of each pump having branches leading to the inlet side of the main and reversing motors respectively, return pipes connecting the outlet of the motors with the inlets of the pumps, a reservoir, pipe connections from said reservoir to the junction of said branches with the flow pipes, and valves controlling such connection, and also pipe connections from said reservoir to said return pipes.

SAMUEL HUGHES.

Witnesses:
B. BOYD,
H. PRESTON.